United States Patent
Nishimura

(10) Patent No.: US 8,477,138 B2
(45) Date of Patent: Jul. 2, 2013

(54) PROJECTOR, NON-TRANSITORY MEDIUM, AND IMAGE GENERATION METHOD

(75) Inventor: Kyoko Nishimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 916 days.

(21) Appl. No.: 12/298,113

(22) PCT Filed: Mar. 14, 2008

(86) PCT No.: PCT/JP2008/054718
§ 371 (c)(1),
(2), (4) Date: Oct. 22, 2008

(87) PCT Pub. No.: WO2008/126634
PCT Pub. Date: Oct. 23, 2008

(65) Prior Publication Data
US 2009/0153562 A1     Jun. 18, 2009

(30) Foreign Application Priority Data
Apr. 5, 2007   (JP) ................................. 2007-099303

(51) Int. Cl.
G06T 11/00     (2006.01)
G06T 17/00     (2006.01)
G09G 5/00      (2006.01)

(52) U.S. Cl.
USPC ........................... 345/467; 345/428; 345/581

(58) Field of Classification Search
None
See application file for complete search history.

(56) References Cited

U.S. PATENT DOCUMENTS 5,539,841 A * 7/1996 Huttenlocher et al. ....... 382/218
6,704,116 B1 * 3/2004 Abulhab ..................... 358/1.11

FOREIGN PATENT DOCUMENTS

| JP | A-01-321555 | 12/1989 |
| JP | A-05-119755 | 5/1993 |
| JP | A-05-188919 | 7/1993 |
| JP | A-2000-250515 | 9/2000 |
| JP | A-2006-079375 | 3/2006 |

* cited by examiner

Primary Examiner — Joni Richer
Assistant Examiner — Michelle Chin
(74) Attorney, Agent, or Firm — Oliff & Berridge, PLC

(57) ABSTRACT

A projector includes a storage section that stores character string data that indicates a character string in at least one language and arrangement designation data that indicates whether the character string in the at least one language is displayed in a left-to-right direction or a right-to-left direction, a determination section that determines arrangement of the character string based on the arrangement designation data, and an image generation section that generates an (OSD) image that shows the character string in the left-to-right direction or the right-to-left direction based on the character string data and the arrangement of the character string determined by the determination section, when the image generation section generates a special image that shows a special character string including at least one of alphanumeric characters and symbols as part of the OSD image, the image generation section generates the special image that displays the special character string in the left-to-right direction.

2 Claims, 4 Drawing Sheets

PROJECTOR, NON-TRANSITORY MEDIUM, AND IMAGE GENERATION METHOD

TECHNICAL FIELD

The present invention relates to an image generation system, a projector, a computer-readable program, a computer-readable medium, and an image generation method that generate an on-screen display (OSD) image.

BACKGROUND ART

A character string in a language utilized in an OSD image is normally used in the left-to-right direction (left-aligned). However, an Arabic character string or the like is used in the right-to-left direction (i.e., right-aligned). In this case, data corresponding to all display patterns in all languages may be stored. However, since the amount of data increases to a large extent, it is difficult to apply such a method due to an increase in cost and the like.

As another method, JP-A-5-188919 discloses a method that calculates the width of row data and determines the arrangement position of the next word corresponding to the designated arrangement such as right alignment or left alignment.

DISCLOSURE OF THE INVENTION

In an OSD image, some characters may be displayed in the right-to-left direction and the remaining characters may be displayed in the left-to-right direction in one row. For example, when displaying an Arabic password input image, the statement is displayed in the right-to-left direction, but characters input to the password input field must be displayed in the left-to-right direction. It is difficult to deal with such a case using the method disclosed in JP-A-5-188919.

The invention may provide an image generation system, a projector, a computer-readable program, a computer-readable medium, and an image generation method that can generate an OSD image corresponding to various types of character arrangement with a small storage capacity.

According to one embodiment of the invention, there is provided an image generation system comprising:

a storage section that stores character string data that indicates a character string in at least one language and arrangement designation data that indicates whether the character string in the at least one language is displayed in a left-to-right direction or a right-to-left direction;

a determination section that determines arrangement of the character string based on the arrangement designation data; and an image generation section that generates an on-screen display (OSD) image that shows the character string in the left-to-right direction or the right-to-left direction based on the character string data and the arrangement of the character string determined by the determination section, when the image generation section generates a special image that shows a special character string including at least one of alphanumeric characters and symbols as part of the OSD image, the image generation section generating the special image that displays the special character string in the left-to-right direction.

According to one embodiment of the invention, there is provided a projector comprising the above-described image generation system, and a projection section that projects the OSD image.

According to one embodiment of the invention, there is provided a computer-readable program executed by a computer, the computer including a storage section, a determination section, and an image generation section, the program causing the computer to perform processing for:

the storage section to store character string data that indicates a character string in at least one language and arrangement designation data that indicates whether the character string in the at least one language is displayed in a left-to-right direction or a right-to-left direction;

the determination section to determine arrangement of the character string based on the arrangement designation data; and the image generation section to generate an on-screen display (OSD) image that shows the character string in the left-to-right direction or the right-to-left direction based on the character string data and the arrangement of the character string determined by the determination section, when the image generation section generates a special image that shows a special character string including at least one of alphanumeric characters and symbols as part of the OSD image, the image generation section generating the special image that displays the special character string in the left-to-right direction.

According to one embodiment of the invention, there is provided a computer-readable medium comprising a computer program executed by a computer, the computer including a storage section, a determination section, and an image generation section, the program causing the computer to perform processing for:

the storage section to store character string data that indicates a character string in at least one language and arrangement designation data that indicates whether the character string in the at least one language is displayed in a left-to-right direction or a right-to-left direction in the storage section;

the determination section to determine arrangement of the character string based on the arrangement designation data; and the image generation section to generate an on-screen display (OSD) image that shows the character string in the left-to-right direction or the right-to-left direction based on the character string data and the arrangement of the character string determined by the determination section, when the image generation section generates a special image that shows a special character string including at least one of alphanumeric characters and symbols as part of the OSD image, the image generation section generating the special image that displays the special character string in the left-to-right direction.

According to one embodiment of the invention, there is provided an image generation method performed by a computer that stores character string data that indicates a character string in at least one language and arrangement designation data that indicates whether the character string in the at least one language is displayed in a left-to-right direction or a right-to-left direction, the method comprising:

determining arrangement of the character string based on the arrangement designation data; and generating an on-screen display (OSD) image that shows the character string in the left-to-right direction or the right-to-left direction based on the character string data and the determined arrangement of the character string, when the computer generates a special image that shows a special character string including at least one of alphanumeric characters and symbols in generating the OSD image, the computer generating the special image that displays the special character string in the left-to-right direction as part of the OSD image.

According to the above embodiments, when the OSD image that shows a right-to-left character string is generated and the OSD image partially includes the special image, the above image generation system and others can generate the special image that shows only the special character string in the left-to-right direction. Therefore, the image generation system and others can generate an OSD image accepting various types of character arrangement with a small storage capacity.

The storage section according to the above embodiments may store coordinate data that indicates an upper-left coordinate position or an upper-right coordinate position of the character string in the at least one language;

when the determination section has determined that the arrangement of the character string is the left-to-right direction, the image generation section may draw the character string from the upper-left coordinate position indicated by the coordinate data; and when the determination section has determined that the arrangement of the character string is the right-to-left direction, the image generation section may determine a total length of the character string based on the character string data, and draw the character string from a coordinate position obtained by subtracting the total length from the upper-right coordinate position indicated by the coordinate data.

According to this configuration, since the above image generation system and others can generate an OSD image that shows the character string in the left-to-right direction or the right-to-left direction by using the character string data, the arrangement designation data, and the coordinate data, the image generation system and others can generate an OSD image accepting various types of character arrangement with a small storage capacity.

The special image according to the above embodiments may include an entry field for the special character string;

the storage section may store maximum character count data that indicates the number of characters that can be input to the entry field; and when the determination section has determined that the arrangement of the character string is the right-to-left direction and the image generation section generates an image that shows an input character string input to the entry field, the image generation section may calculate a subtractive value by subtracting the number of characters of the input character string from the number of characters that can be input to the entry field based on the maximum character count data, determine the total length by summing up the number of characters of the input character string, the subtractive value, and the number of characters of the character string displayed in the right-to-left direction based on the character string data, and draw a composite character string from a coordinate position obtained by subtracting the total length from the upper-right coordinate position indicated by the coordinate data, the composite character string being obtained by adding the character string displayed in the right-to-left direction after an additional character string obtained by adding a blank character string corresponding to the subtractive value to the input character string.

According to this configuration, since the image generation system and others can generate an OSD image by using the character string data, the arrangement designation data, and the coordinate data even when a right-to-left character string is added to a left-to-right input string in generating an OSD image, the image generation system and others can generate an OSD image accepting various types of character arrangement with a small storage capacity.

BEST MODE FOR CARRYING OUT THE INVENTION

The invention is described below with reference to the drawings taking an example in which the invention is applied to a projector. Note that the following embodiments do not in any way limit the scope of the invention defined by the claims laid out herein. Note also that all elements of the following embodiments should not be taken as essential requirements for the invention defined by the claims laid out herein.

First Embodiment

Figure 1:
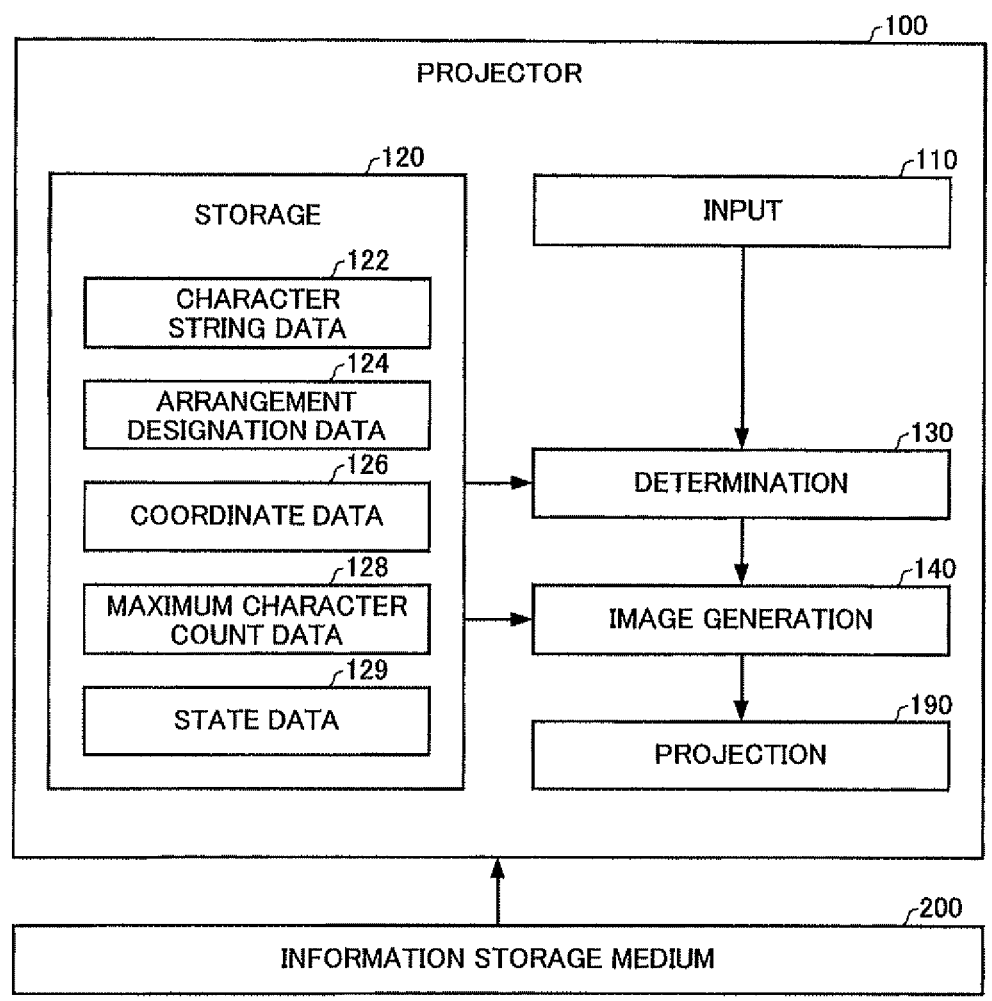
FIG. 1 is a functional block diagram showing a projector according to one embodiment of the invention.

FIG. 1 is a functional block diagram showing a projector 100 according to one embodiment of the invention. The projector 100 includes an input section 110 that generates input information when the user has selected the default language, input a password, or the like, a storage section 120 that stores various types of data, a determination section 130 that makes various types of determination, an image generation section 140 that generates various images, and a projection section 190 that projects the image. In this embodiment, the projector 100 sets the user's mother tongue selected by the user to be the default language, and generates an OSD image in the default language, for example.

The storage section 120 stores character string data 122 that indicates a character string (including a font) corresponding to each language, arrangement designation data 124 that indicates whether the character string corresponding to each language is displayed in the left-to-right (LTR) direction or the right-to-left (RTL) direction, coordinate data 126 that indicates the upper-left coordinate position or the upper-right coordinate position of the character string in the image, maximum character count data 128 that indicates the number of characters that can be input to an entry field (e.g., password input field), state data 129 that indicates the default language (predetermined or selected by the user) to be used, and the like.

Note that the storage section 120, the determination section 130, and the image generation section 140 form an image generation system that generates an image. A character string written in Japanese, English, or the like is displayed in the left-to-right direction, and a character string written in Arabic, Persian, or the like is displayed in the right-to-left direction, for example.

A button, a remote controller, or the like may be used as the input section 110. A flash memory or the like may be used as the storage section 120. A CPU or the like may be used as the determination section 130. A CPU, an image processing circuit, or the like may be used as the image generation section 140. A lamp, a liquid crystal panel, a lens, and the like may be used as the projection section 190.

The projector 100 may implement the functions of the image generation section 140 and the like by causing the projector 100 to read a program for implementing the functions of the image generation section 140 and the like from an information storage medium 200. A CD-ROM, a DVD-ROM, a ROM, a RAM, an HDD, or the like may be applied as the information storage medium 200. A method of reading the program from the information storage medium 200 may be a contact method or a non-contact method.

Figure 2:
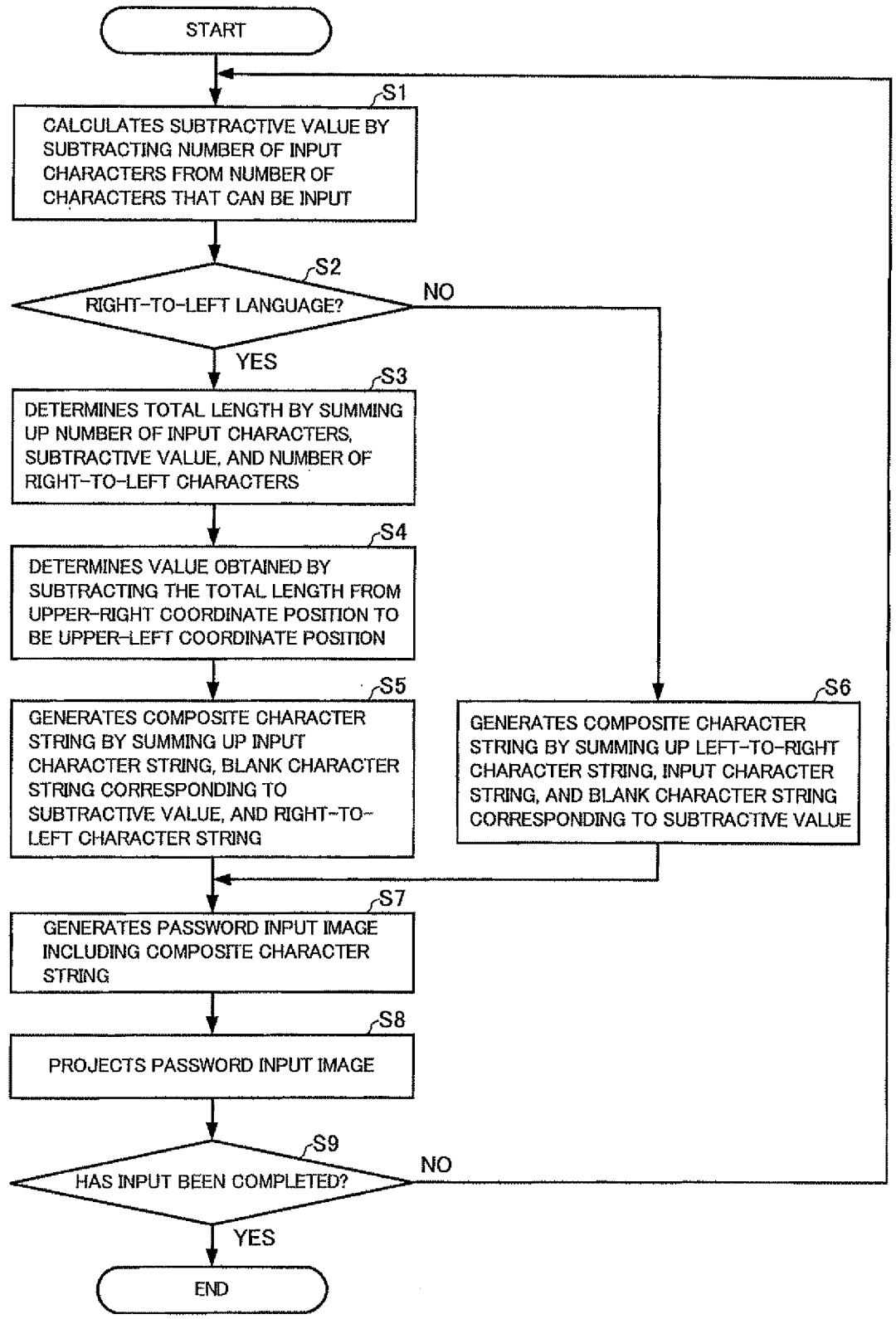
FIG. 2 is a flowchart showing the flow of a password input process according to one embodiment of the invention.

The flow of a process when the projector 100 projects a password input image as the OSD image is described below. FIG. 2 is a flowchart showing the flow of a password input process according to this embodiment.

When the determination section 130 has determined that the user has input a password input image display instruction using the input section 110, the image generation section 140 calculates a subtractive value by subtracting the number of characters input to the password input field from the number of characters indicated by the maximum character count data 128 (step S1).

Figure 3A:
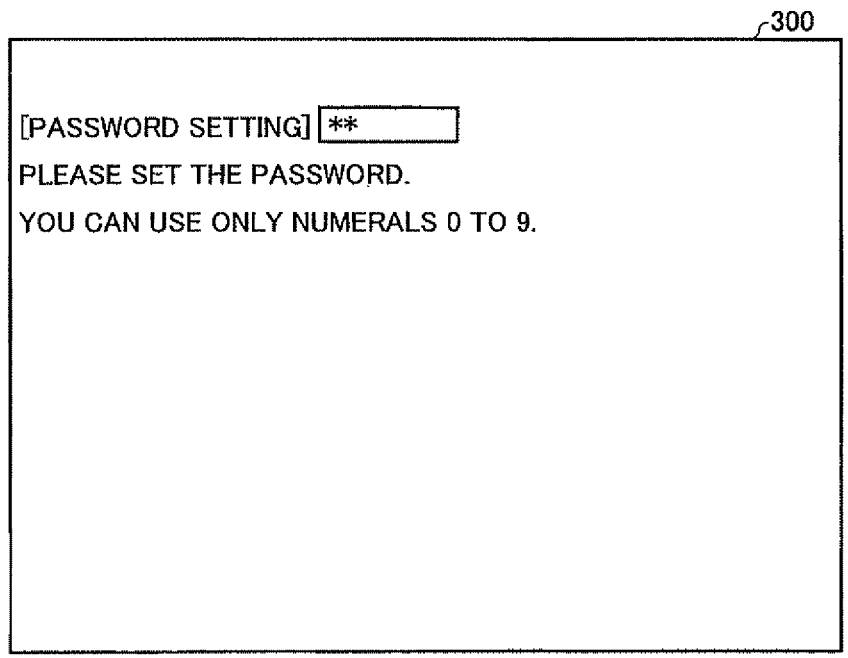
FIG. 3A shows an example of a password input image in a left-to-right language according to one embodiment of the invention.
Figure 3B:
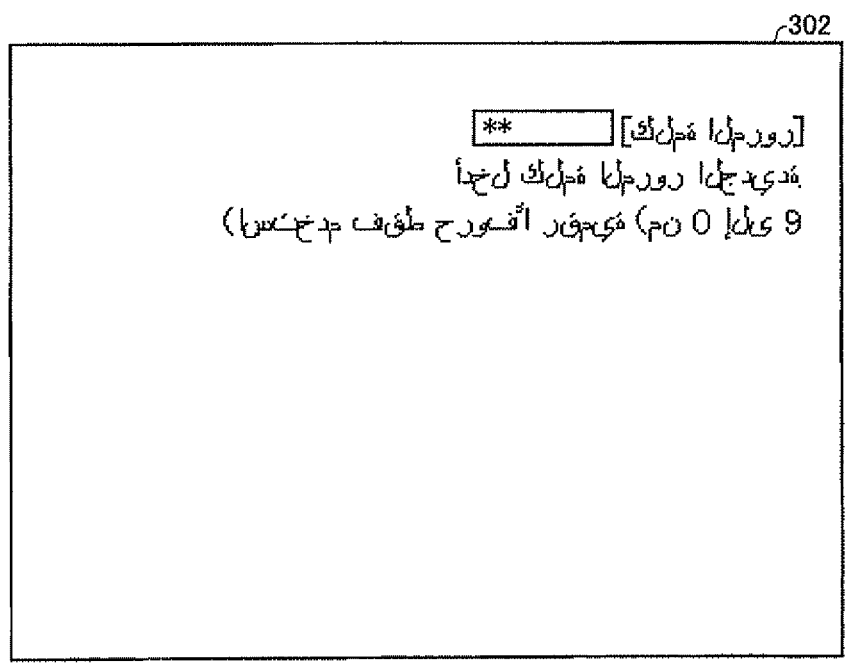
FIG. 3B shows an example of a password input image in a right-to-left language according to one embodiment of the invention.

FIG. 3A shows an example of a password input image 300 according to this embodiment when the language is written in the left-to-right direction. FIG. 3B shows an example of a password input image 302 according to this embodiment when the language is written in the right-to-left direction.

For example, the password input image 300 is an OSD image that prompts the user to input a password in Japanese. In the example shown in FIG. 3A, two characters have been input to the password input field. In this embodiment, the password is input in numerals and is indicated by *. The Japanese character string is displayed in the left-to-right direction, and the password is also displayed in the left-to-right direction.

The password input image 302 is an OSD image that prompts the user to input a password in Arabic. In the example shown in FIG. 3B, two characters have been input to the password input field. The Arabic character string is displayed in the right-to-left direction, and the password is displayed in the left-to-right direction.

In this embodiment, the following process is performed in order to deal with the case of displaying a special image such as the password input field shown in FIG. 3B. The determination section 130 determines whether or not the default language is a right-to-left language based on the state data 129 (step S2).

When the default language is a right-to-left language, the image generation section 140 determines the total length by summing up the number of input characters based on the input information from the input section 110, the subtractive value calculated in the step S1, and the number of characters of the character string (e.g., the Arabic character string corresponding to "password setting") written in the right-to-left language indicated by the character string data 122 (step S3).

The image generation section 140 determines a value obtained by subtracting the total length calculated in the step S3 from the upper-right coordinate position of the character string indicated by the arrangement designation data 124 to be the upper-left coordinate position (step S4), and generates a composite character string by adding the right-to-left character string after an additional character string obtained by adding a blank character string corresponding to the subtractive value after the input string (step S5).

Figure 4:
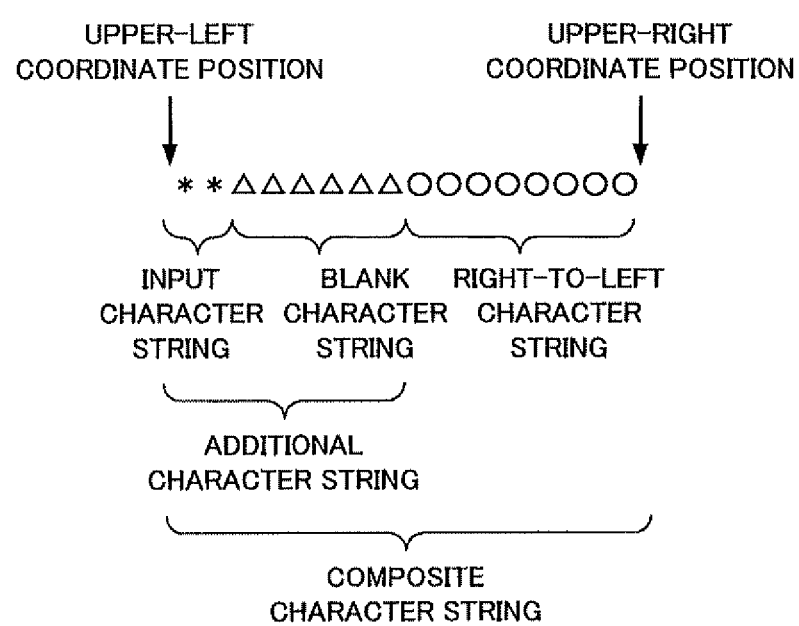
FIG. 4 is a schematic diagram showing a composite character string according to one embodiment of the invention.

FIG. 4 is a schematic diagram showing the composite character string according to this embodiment. For example, the display-target character string data 122 indicates an eight-character right-to-left character string (i.e., the data relating to each character is stored in the left-to-right direction). The upper-right coordinate position is set as the arrangement designation data 124 corresponding to the character string. Note that the upper-left coordinate position is set as the arrangement designation data 124 when the character string is a left-to-right character string.

For example, when the number of characters that can be input as the password is "8", the maximum character count data 128 corresponding to the password input field indicates "8". The number of input characters is "2" when two characters have been input as the password.

In this case, the subtractive value is six (=8-2), and the additive value and the total length are sixteen (=2+6+8). Therefore, the upper-left coordinate position is set at a position shifted to the left from the upper-right coordinate position by 16 characters. The composite character string is a character string obtained by adding the eight-character right-to-left character string to the eight-character additional character string obtained by adding the six-character blank character string to the two-character input string. The number of characters may be in character units or data units (e.g., byte units or bit units).

When the default language is not a right-to-left language (i.e., the default language is a left-to-right language), the image generation section 140 generates the composite character string by adding the left-to-right character string before the additional character string obtained by adding the blank character string corresponding to the subtractive value to the input string (step S6).

The image generation section 140 generates the password input image 300 or 302 including the composite character string generated in step S5 or S6 (step S7). When the image generation section 140 generates the password input image 300 or 302, the image generation section 140 draws the composite character string from the upper-left coordinate position determined in the step S4 when the composite character string is a right-to-left character string, and draws the composite character string from the upper-left coordinate position indicated by the coordinate data 126 when the composite character string is a left-to-right character string. The projection section 190 projects the password input image 300 or 302 (step S8).

The determination section 130 determines whether or not the input has been completed (step S9). The projector 100 repeats the process in the steps S1 to S9 when the input has not been completed. When the input has been completed, the projector 100 finishes the password input process, and performs a password authentication process and the like.

According to this embodiment, when the OSD image partially includes the special image (password input field in this embodiment) when generating the OSD image that shows the right-to-left character string, the projector 100 can generate an image that shows only the special character string (password in this embodiment) in the left-to-right direction. Therefore, the projector 100 can generate an OSD image corresponding to various types of character arrangement with a small storage capacity.

According to this embodiment, since the projector 100 can generate an OSD image that shows a left-to-right character string or a right-to-left character string using the character string data 122, the arrangement designation data 124, and the coordinate data 126, the projector 100 can generate an OSD image corresponding to various types of character arrangement with a small storage capacity.

According to this embodiment, since the projector 100 can generate an OSD image using the character string data 122, the arrangement designation data 124, and the coordinate data 126 even when generating an OSD image by adding a right-to-left character string to a left-to-right input string, the projector 100 can generate an OSD image corresponding to various types of character arrangement with a small storage capacity.

According to this embodiment, the image generation section 140 can draw the composite character string at high speed by utilizing the character string data 122 (font data) corresponding to each language instead of drawing the composite character string while changing a font corresponding to each character string.

Other Embodiments

The invention is not limited to the above-described embodiments. Various modifications and variations may be made. For example, the special image that displays a left-to-right character string in a right-to-left language is not limited to the password input image, but may be an image in which a character string is formed by alphanumeric characters and symbols, such as an error message notification image, a mail address input image, or a mail address display image. The special character string may not be displayed in the same row as that of the normal character string, but may be displayed in a row differing from that of the normal character string.

The OSD image is not limited to an image including the special image, but may be an image that does not include the special image. For example, the OSD image may be a configuration image, a state notification image, or the like. When only one language is used, the state data 129 that indicates the default language and the input section 110 for inputting the selected language are unnecessary.

The above embodiments have been described taking an example in which the OSD image partially includes the special image. Note that the entire OSD image may be the special image. For example, when the default language is a right-to-left language, the image generation section 140 may generate an image that displays an error message in the left-to-right direction when displaying an error message notification image as the OSD image.

A character string included in the OSD image may be a character string provided with a decoration such as a shadow. The composite character string generation method is not limited to the method described in the above embodiments. For example, a blank character string may be added before the input string, or a left-to-right character string or a right-to-left character string may be added before the additional character string.

The image generation system may be formed as an image generation circuit. The device including the image generation system is not limited to the projector 100, but may be various devices that generate an OSD image, such as a personal computer (PC), a printer, a television, and a portable telephone.

The projector 100 is not limited to a liquid crystal projector, but may be a projector using a digital micromirror device (DMD) or the like. The functions of the projector 100 may be distributed throughout a plurality of devices (e.g., PC and projector). DMD is a registered trademark of Texas Instruments Inc.

The invention claimed is:

1. An image generation system comprising:
a storage section that stores character string data that indicates a character string in at least one language and arrangement designation data that indicates whether the character string in the at least one language is displayed in a left-to-right direction or a right-to-left direction;
a determination section that determines arrangement of the character string based on the arrangement designation data; and
an image generation section that generates an on-screen display (OSD) image that shows the character string in the left-to-right direction or the right-to-left direction based on the character string data and the arrangement of the character string determined by the determination section,
when the image generation section generates a special image that shows a special character string including at least one of alphanumeric characters and symbols as part of the OSD image, the image generation section generating the special image that displays the special character string in the left-to-right direction,
the storage section storing coordinate data that indicates an upper-left coordinate position or an upper-right coordinate position of the character string in the at least one language;
when the determination section has determined that the arrangement of the character string is the left-to-right direction, the image generation section drawing the character string from the upper-left coordination position indicated by the coordinate data; and
when the determination section has determined that the arrangement of the character string is the right-to-left direction, the image generation section determining a total length of the character string based on the character string data, and drawing the character string from a coordinate position obtained by subtracting the total length from the upper-right coordinate position indicated by the coordinate data.

2. An image generation system comprising:
a storage section that stores character string data that indicates a character string in at least one language and arrangement designation data that indicates whether the character string in the at least one language is displayed in a left-to-right direction or a right-to-left direction;
a determination section that determines arrangement of the character string based on the arrangement designation data; and
an image generation section that generates an on-screen display (OSD) image that shows the character string in the left-to-right direction or the right-to-left direction based on the character string data and the arrangement of the character string determined by the determination section,
when the image generation section generates a special image that shows a special character string including at least one of alphanumeric characters and symbols as part of the OSD image, the image generation section generating the special image that displays the special character string in the left-to-right direction,
the storage section storing coordination data that indicates an upper-left coordination position or an upper-right coordinate position of the character string in the at least one language;
when the determination section has determined that the arrangement of the character string is the right-to-left direction, the image generation section drawing the character string from the upper-left coordinate position indicated by the coordinate data;
when the determination section has determined that the arrangement of the character string is the right-to-left direction, the image generation section determining a total length of the character string based on the character string data, and drawing the character string from a coordinate position obtained by subtracting the total length from the upper-right coordinate position indicated by the coordinate data;

the special image including an entry field for the special character string;

the storage section storing maximum character count data that indicates the number of characters that can be input to the entry field; and when the determination section has determined that the arrangement of the character string is the right-to-left direction and the image generation section generates an image that shows an input character string input to the entry field, the image generation section calculating a subtractive value by subtracting the number of characters of the input character string from the number of characters that can be input to the entry field based on the maximum character count data, determining the total length by summing up the number of characters of the input character string, the subtractive value, and the number of characters of the character string displayed in the right-to-left direction based on the character string data, and drawing composite character string from a coordinate position obtained by subtracting the total length from the upper-right coordinate position indicated by the coordinate data, the composite character string being obtained by adding the character string displayed in the right-to-left direction after an additional character string obtained by adding a blank character string corresponding to the subtractive value to the input character string.

* * * * *